United States Patent
Brodsky et al.

(10) Patent No.: US 11,153,668 B2
(45) Date of Patent: *Oct. 19, 2021

(54) BANDWIDTH PROVISIONING FOR AN ENTANGLED PHOTON SYSTEM

(71) Applicant: AT&T Intellectual Property I, L.P., Atlanta, GA (US)

(72) Inventors: Michael Brodsky, Millburn, NJ (US); Cristian Antonelli, Sulmona (IT); Jungmi Oh, Daejeon (KR)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/779,771

(22) Filed: Feb. 3, 2020

(65) Prior Publication Data
US 2020/0177977 A1 Jun. 4, 2020

Related U.S. Application Data

(63) Continuation of application No. 15/944,389, filed on Apr. 3, 2018, now Pat. No. 10,595,102, which is a continuation of application No. 14/146,307, filed on Jan. 2, 2014, now Pat. No. 9,967,637, which is a continuation of application No. 13/592,504, filed on Aug. 23, 2012, now Pat. No. 8,699,876, which is a
(Continued)

(51) Int. Cl.
*H04Q 11/00* (2006.01)
*H04B 10/70* (2013.01)
*H04L 9/08* (2006.01)

(52) U.S. Cl.
CPC ......... *H04Q 11/0005* (2013.01); *H04B 10/70* (2013.01); *H04L 9/0852* (2013.01)

(58) Field of Classification Search
CPC .... H04Q 11/0005; H04B 10/70; H04L 9/0852
See application file for complete search history.

(56) References Cited

U.S. PATENT DOCUMENTS 5,307,410 A 4/1994 Bennett
5,796,477 A 8/1998 Teich et al.
(Continued)

OTHER PUBLICATIONS

A. K. Ekert, "Quantum cryptography based on Bell's theorem," Phys. Rev. Lett., vol. 67, pp. 661-663, 1991.
(Continued)

*Primary Examiner* — Leslie C Pascal

(57) ABSTRACT

A quantum key distribution system is deployed in an optical fiber network transporting classical data traffic. A source of entangled photon pairs is used to generate quantum keys. Classical data traffic is typically transported over channels in the C-band. If a pair of channels for transport of quantum data is available within the C-band, then the source of entangled photon pairs is tuned to emit in a pair of channels in the C-band. If a pair of channels for transport of quantum data is not available within the C-band, then the source of entangled photon pairs is tuned to emit in a pair of channels in a combined S-band and L-band. When a periodically-poled lithium niobate waveguide pumped with a laser is used for the source of entangled photon pairs, the output spectral properties are tuned by varying the temperature of the waveguide.

20 Claims, 16 Drawing Sheets

Related U.S. Application Data continuation of application No. 12/882,752, filed on Sep. 15, 2010, now Pat. No. 8,280,250.

(56) References Cited

U.S. PATENT DOCUMENTS

| | | | |
|---|---|---|---|
| 6,567,164 | B2 | 5/2003 | Birk et al. |
| 6,822,739 | B2 | 11/2004 | Sergienko et al. |
| 6,982,822 | B2 | 1/2006 | Teich et al. |
| 7,102,121 | B2 | 9/2006 | Lagasse |
| 7,211,812 | B2 | 5/2007 | Takeuchi |
| 7,292,342 | B2 | 11/2007 | Zaugg |
| 7,408,637 | B2 | 8/2008 | Freeling et al. |
| 7,570,365 | B2 | 8/2009 | Trifonov et al. |
| 7,683,361 | B2 | 3/2010 | Edamatsu et al. |
| 7,684,015 | B2 | 3/2010 | Shih |
| 8,280,250 | B2 | 10/2012 | Brodsky et al. |
| 8,699,876 | B2 | 4/2014 | Brodsky et al. |
| 9,967,637 | B2 | 5/2018 | Brodsky et al. |
| 10,595,102 | B2 * | 3/2020 | Brodsky ............ H04B 10/70 |
| 2002/0018290 | A1 | 2/2002 | Birk et al. |
| 2002/0093632 | A1 | 7/2002 | Teich et al. |
| 2004/0036877 | A1 | 2/2004 | Sergienko et al. |
| 2004/0042513 | A1 | 3/2004 | Teich et al. |
| 2005/0094142 | A1 | 5/2005 | Takeuchi |
| 2005/0199812 | A1 | 9/2005 | Shih |
| 2005/0206904 | A1 | 9/2005 | Zaugg |
| 2005/0243324 | A1 | 11/2005 | Freeling et al. |
| 2007/0216991 | A1 | 9/2007 | Edamatsu et al. |
| 2007/0291811 | A1 | 12/2007 | Conti |
| 2008/0063015 | A1 | 3/2008 | Trifonov et al. |
| 2009/0028340 | A1 | 1/2009 | Trifonov |
| 2009/0180616 | A1 | 7/2009 | Brodsky et al. |
| 2009/0180776 | A1 | 7/2009 | Brodsky et al. |
| 2010/0111541 | A1 | 5/2010 | Trojek et al. |
| 2010/0123091 | A1 | 5/2010 | Gilbert et al. |
| 2012/0051740 | A1 | 3/2012 | Arahira |

OTHER PUBLICATIONS

D. Branning, S. Bhandari, and M. Beck, "Low-cost coincidence-counting electronics for undergraduate quantum optics," Am. J. Phys., vol. 77, pp. 667-670, 2009.

G. Baxter, S. Frisken, D. Abakoumov, H. Zhou, I. Clarke, A. Bartos, and S. Poole, "Highly Programmable Wavelength Selective Switch Based on Liquid Crystal on Silicon Switching Elements," in Optical Fiber Communication Conference and Exposition and The National Fiber Optic Engineers Conference, Technical Digest (CD), 2006, paper OTuF2.

H. C. Lim, A. Yoshizawa, H. Tsuchida, and K. Kikuchi, "Wavelength-multiplexed distribution of highly entangled photon-pairs over optical fiber," Opt. Express, vol. 16, pp. 22099-22104, 2008.

M. Halder, A. Beveratos, R. T. Thew, C. Jorel, H. Zbinden and N. Gisin, "High coherence photon pair source for quantum communication," New. J. Phys., vol. 10, pp. 023027-023039, 2008.

N. Gisin, G. Ribordy, W. Tittel, and H. Zbinden, "Quantum cryptography," Rev. Mod. Phys., vol. 74, pp. 145-195, 2002.

T. Ducellier, A. Hnatiw, M. Mala, S. Shaw, A. Mank, D. Touahri, D. McMullin, T. Zami, B. Lavigne, P. Peloso, and O. Leclerc, "Novel High Performance Hybrid Waveguide-MEMS 1x9 Wavelength Selective Switch in a 32-Cascade Loop xperiment," in Proceedings of European Conference on Optical Communication, Stockholm, Sweden, 2004, paper Th4.2.2.

T. E. Chapuran, P. Toliver, N. A. Peters, J. Jackel, M. S. Goodman, R. J. Runser, S. R. McNown, N. Dallmann, R. J. Hughes, K. P. McCabe, J. E. Nordholt, C. G. Peterson, K. T. Tyagi, L. Mercer, and H. Dardy, "Optical networking for quantum key distribution and quantum communications," New J. Phys., vol. 11, pp. 105001-105019, 2009.

* cited by examiner

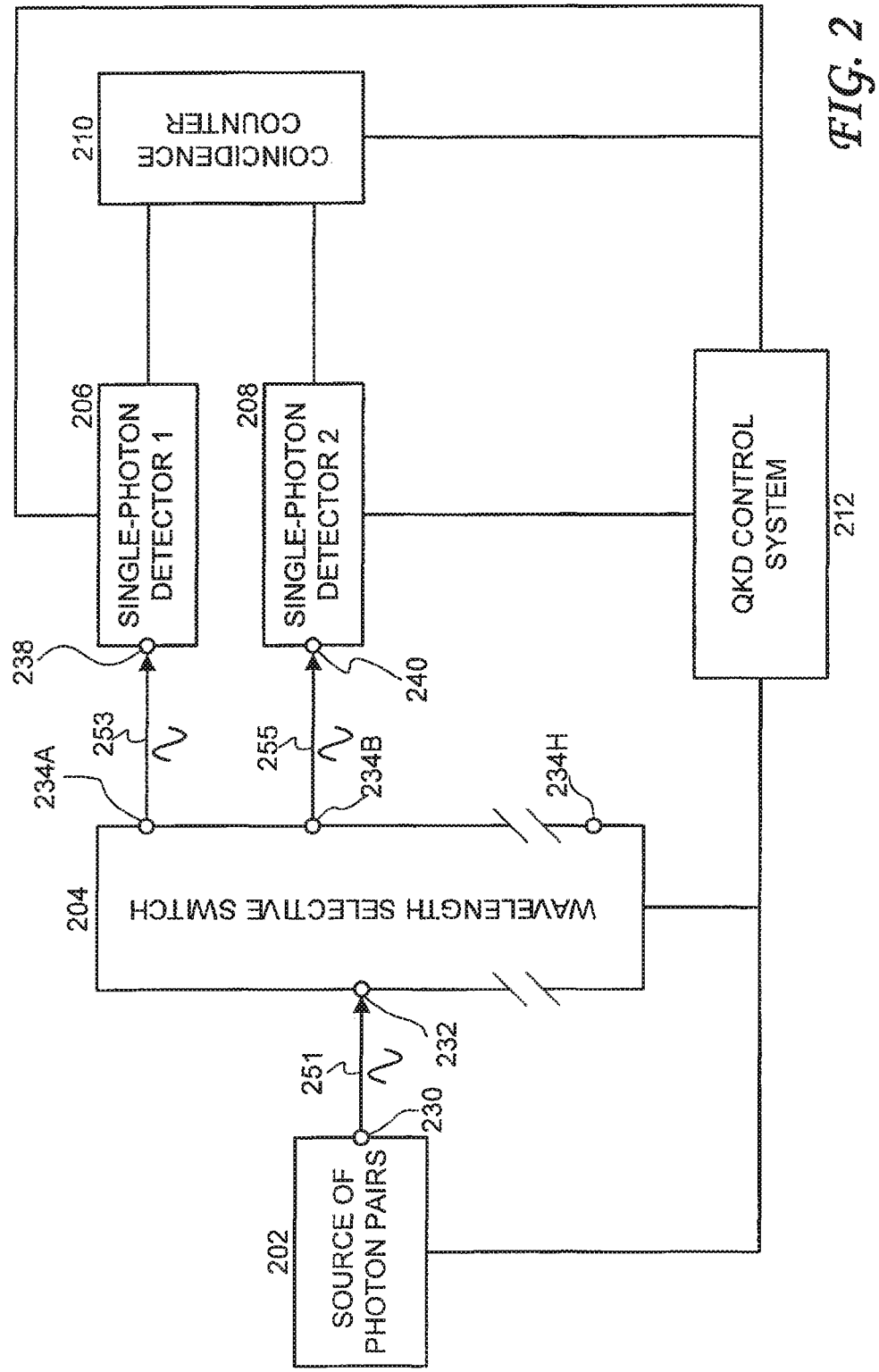

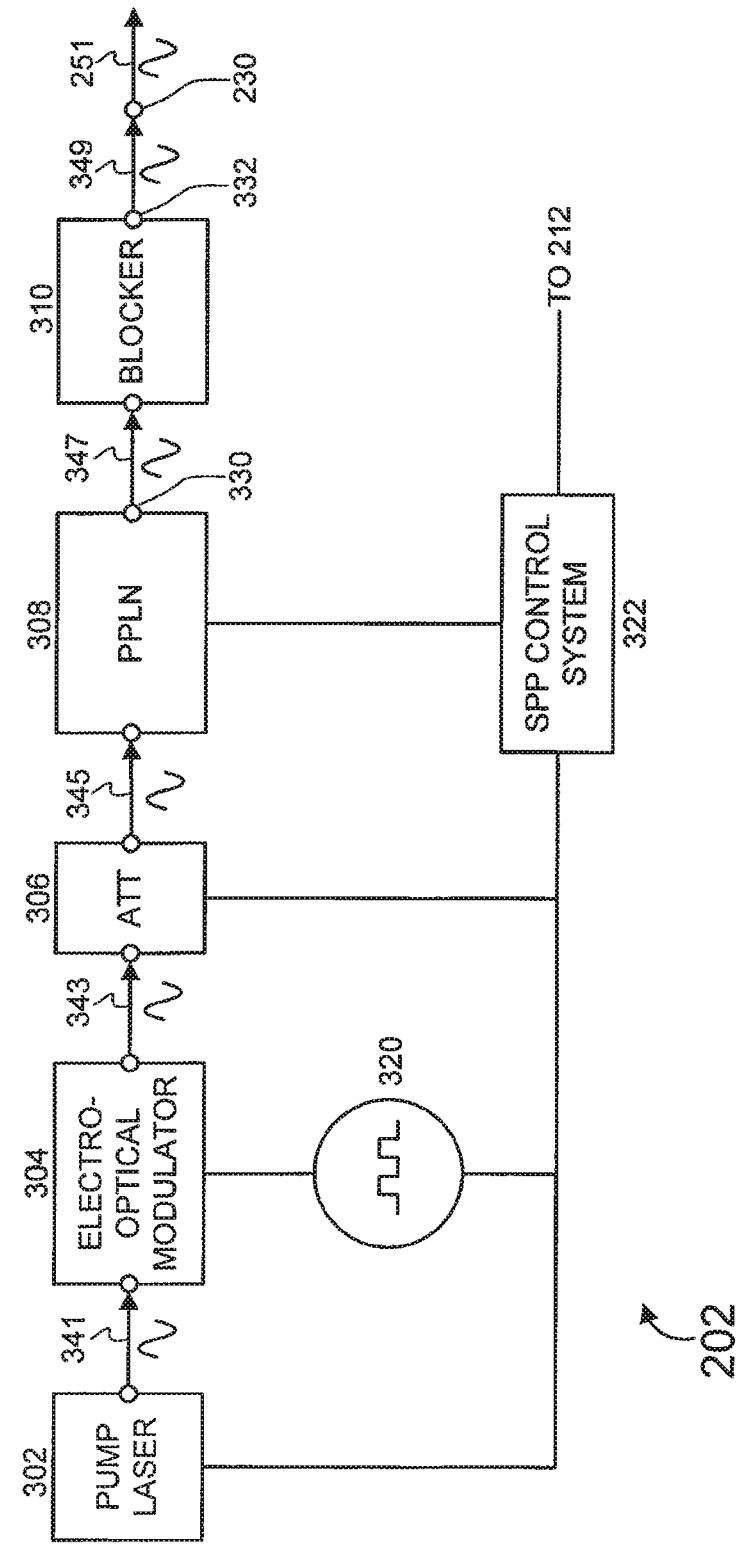

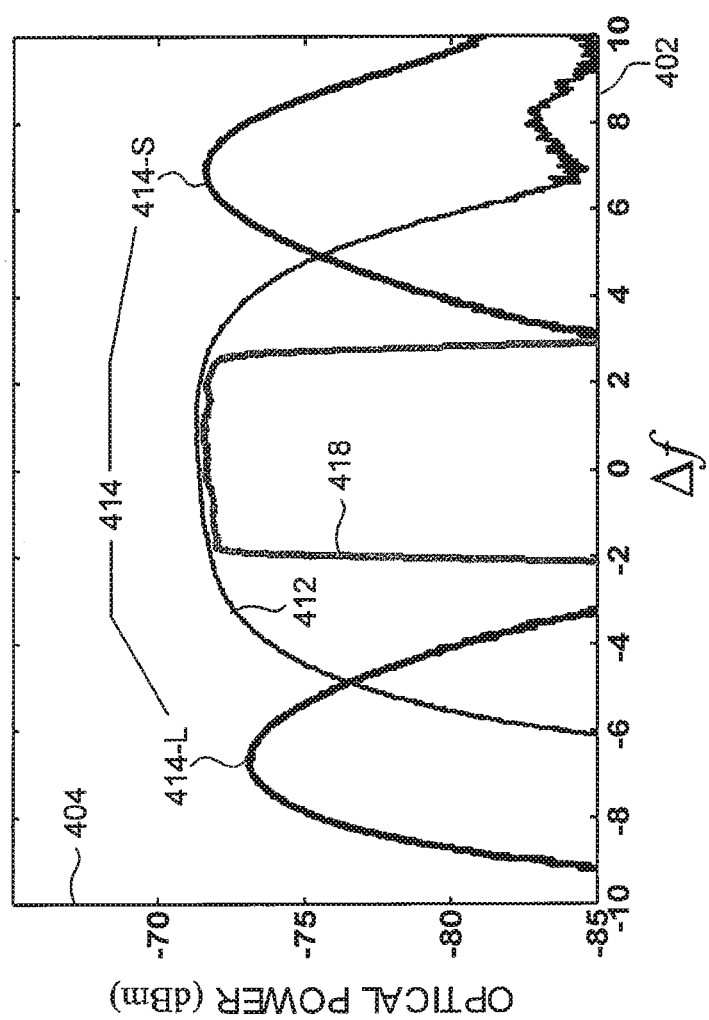

BANDWIDTH PROVISIONING FOR AN ENTANGLED PHOTON SYSTEM

CROSS-REFERENCE TO RELATED APPLICATIONS

This application is a continuation of prior application Ser. No. 15/944,389, filed on Apr. 3, 2018, which is a continuation of prior application Ser. No. 14/146,307, filed on Jan. 2, 2014, and issued as U.S. Pat. No. 9,967,637, which is a continuation of prior application Ser. No. 13/592,504, filed Aug. 23, 2012, and issued as U.S. Pat. No. 8,699,876, which is a continuation of prior application Ser. No. 12/882,752, filed Sep. 15, 2010, and issued as U.S. Pat. No. 8,280,250, the disclosures of all are hereby incorporated by reference herein in their entirety.

This application is related to U.S. patent application Ser. No. 12/882,788, filed on Sep. 15, 2010, and issued as U.S. Pat. No. 8,611,535, on Dec. 17, 2013, entitled "Characterization of an Entangled Photon System", the disclosure of which is herein incorporated by reference in its entirety.

BACKGROUND

The present disclosure relates generally to entangled photon systems, and more particularly to bandwidth provisioning of entangled photon systems.

A method for providing secure transmission of data across a data network involves encrypting the data at the source (sender), transmitting the encrypted data across the data network, and decrypting the encrypted data at the receiver. Reliable methods for encryption/decryption include those that use a secret key known only to the sender and receiver. The issue then arises of how to transmit the key securely between the sender and the receiver.

Optical transmission across optical fibers is widely used in telecommunications networks. Quantum key distribution exploits the quantum physics properties of photons to securely transport keys across an optical network. One method of quantum key distribution encodes information bits in pairs of entangled photons. In each entangled pair, the quantum properties of the individual photons are strongly correlated even when they are separated geographically. In one architecture, a sequence of pairs of entangled photons carrying the information bits for the key are created at a centralized source. For each pair of entangled photons, one photon is transmitted to User 1, and the correlated photon is transmitted to User 2. User 1 and User 2 can individually recover the key from their respective sequence of received photons. Comparison of the quantum states of the photons received by each user can reveal whether a third party has eavesdropped on the quantum key transmission or has substituted a separate quantum key.

In an optical network, channels can be used for quantum data or classical data. Since the transport of quantum data uses very low photon fluxes, the transport of classical data strongly interferes with the transport of quantum data. Method and apparatus for dynamically provisioning quantum channels are advantageous for exploiting available bandwidth.

BRIEF SUMMARY

A quantum key distribution system is deployed in an optical fiber network transporting classical data traffic. A source of entangled photon pairs is used to generate quantum keys. Classical data traffic is typically transported over channels in a first frequency band. If a pair of channels for transport of quantum data is available within the first frequency band, then the source of entangled photon pairs is tuned to emit pairs of entangled photons in a pair of channels within the first frequency band. If a pair of channels for transport of quantum data is not available within the first frequency band, then the source of entangled photon pairs is tuned to emit pairs of entangled photons in a pair of channels within a combined second frequency band and third frequency band.

In an embodiment, the first frequency band is the telecommunications C-band, the second frequency band is the telecommunications S-band, and the third frequency band is the telecommunications L-band. The source of entangled photon pairs is a periodically-poled lithium niobate waveguide pumped with a laser. The output spectral properties of the light emitted from the waveguide is tuned by varying the temperature of the waveguide.

These and other advantages of the disclosure will be apparent to those of ordinary skill in the art by reference to the following detailed description and the accompanying drawings.

BRIEF DESCRIPTION OF THE DRAWINGS

FIG. 2 shows a high-level schematic of an optical network configured to measure photon statistics;

FIG. 3 shows a high-level schematic of a source of photon pairs;

FIG. 4A and FIG. 4B show plots of output spectra as a function of the temperature of the source of photon pairs;

DETAILED DESCRIPTION

Figure 1A:
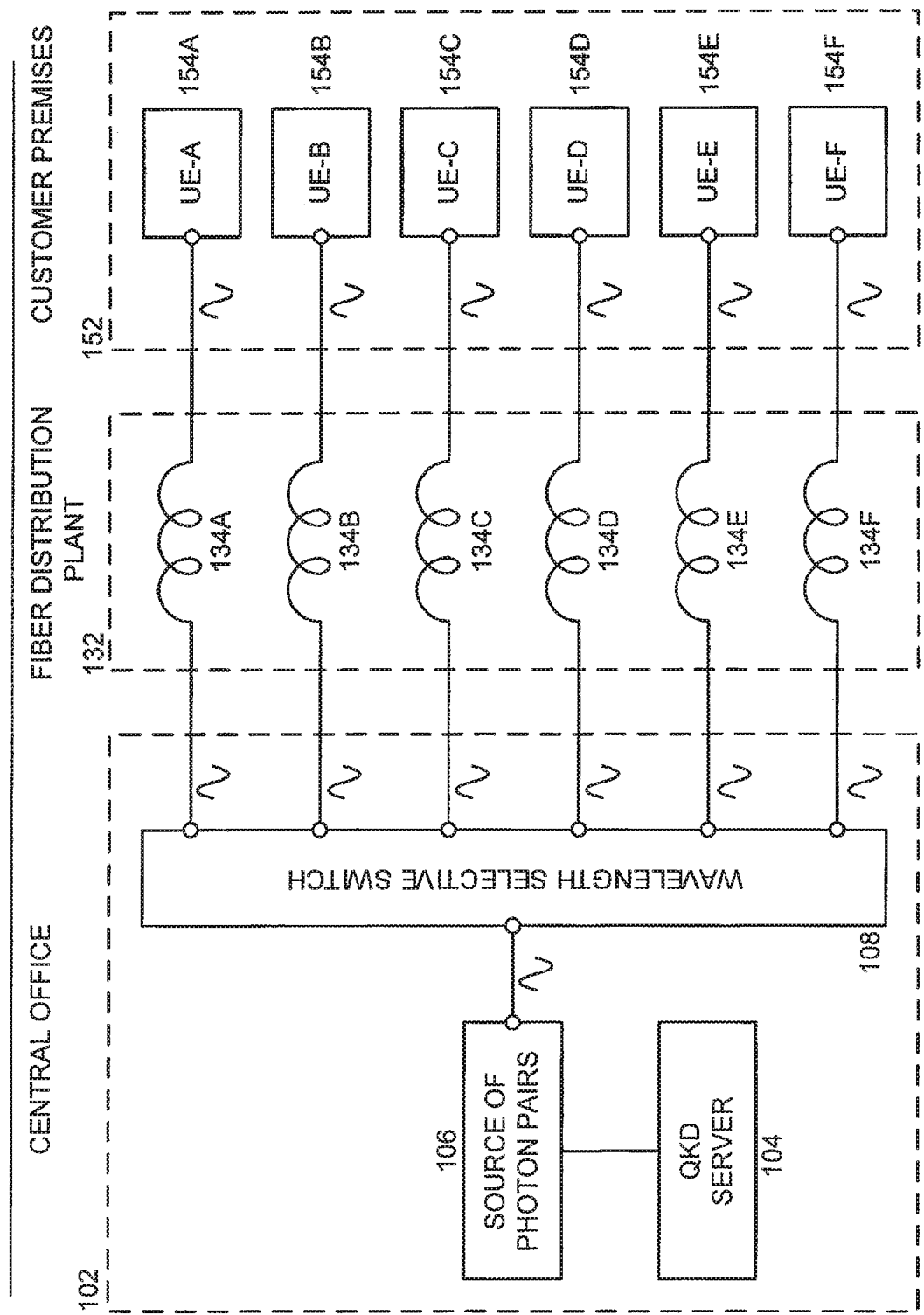
FIG. 1A shows a high-level schematic of an optical network configured to distribute quantum keys.

FIG. 1A shows a high-level schematic of an embodiment of a quantum key distribution (QKD) network implemented via the network of a telecommunications services provider. Shown are three principle locations of interest: central office 102, fiber distribution plant 132, and customer premises 152. In the central office 102, a QKD server 104 communicates with a source of photon pairs (SPP) 106. QKD server 104 can communicate with SPP 106 via different modes; for example, directly via a local interface, remotely via a communications network, or via an intermediate control system, such as QKD control system 212 (described below with reference to FIG. 2). QKD server 104 generates a random number bit stream as a key. The random number bit stream modulates transmission of photon pairs emitted by SPP 106. The two photons in a pair are entangled with strong correlation of quantum states.

The output of SPP 106 is transmitted to the input port of a wavelength selective switch (WSS) 108. The output ports of WSS 108 are coupled via individual optical fibers in the fiber distribution plant 132 to user equipment (UE) located in customer premises 152. Examples of UE include servers and personal computers outfitted with, or coupled to, single-photon detectors (see below). In the example shown in FIG. 1A, there are six user equipment UE-A 154A-UE-F 154F, which in general are geographically dispersed, coupled to WSS 108 via optical fiber 134A-optical fiber 134F, respectively. The number of UE that can be coupled to the network depends on the number of output ports in WSS 108. For simplicity, each optical fiber is shown as a point-to-point run between an output port in WSS 108 and an input port in a UE. In general, there can be intermediate connections, such as in the local exchange office, outside plant, and customer premises distribution closet (not shown).

In general, the locations of the network elements in FIG. 1A can be user-specified and are not limited to the network of a telecommunications services provider. As mentioned above, QKD server 104 can communicate remotely with SPP 106 via a communications network. QKD server 104, SPP 106, WSS 108, and UE-A 154A-UE-F 154F can be located, for example, within a building, a campus, or a metro region. The fiber connections can be provided over a private network instead of over the network of a telecommunications services provider.

FIG. 2 shows a high-level schematic of an optical system for distributing quantum keys. To simplify the description, an optical system configured for a single pair of users is described. In general, the optical system can be configured for multiple pairs of users. The source of photon pairs (SPP) 202 transmits optical beam 251 from the output port 230 of SPP 202 over an optical fiber to input port 232 of wavelength selective switch (WSS) 204. In this example, WSS 204 has eight output ports, referenced as output port A 234A-output port H 234H. To simplify the figure, only output port A 234A, output port B 234B, and output port H 234H are explicitly shown. Optical beam 253 is transmitted from output port A 234A of WSS 204 over an optical fiber to input port 238 of single-photon detector 1 (SPD-1) 206. Similarly, optical beam 255 is transmitted from output port B 234B of WSS 204 over an optical fiber to input port 240 of single-photon detector 2 (SPD-2) 208. The single-photon detectors operate in a gated mode (discussed below) and are synchronized with an electro-optical modulator 304 (described below with reference to FIG. 3).

Coincidence counter 210 receives the detected signals from both SPD-1 206 and SPD-2 208. In one embodiment, the single-photon detectors output an electrical transistor-transistor logic (TTL) pulse for each detection event, and coincidence counter 210 measures both individual and coincidence events. A coincidence event occurs when SPD-1 206 and SPD-2 208 each detect a photon at the same time. In one embodiment, coincidence counter 210 can be implemented by a detector based on logic gates and implemented via a field programmable gate array (FPGA). A coincidence counter can also be implemented by other electronic assemblies; for example, nuclear instrumentation modules (NIMs) and time delay modules. In one embodiment, QKD control system 212 controls the operation of the SPP 202, WSS 204, SPD-1 206, SPD-2 208, and coincidence counter 210. An embodiment of QKD control system 212 is described below with reference to FIG. 11.

In other embodiments, the coincidence counts are not measured directly with a coincidence counter. The clocks controlling the timing of SPD-1 206 and SPD-2 208 are first synchronized. The individual counts from SPD-1 206 and SPD-2 208 are then compared, and the coincident counts are determined.

FIG. 3 shows a high-level schematic of an embodiment of SPP 202 that generates pairs of photons in the telcom frequency band by spontaneous parametric down conversion (SPDC) in a periodically-poled lithium niobate (PPLN) waveguide. Pump laser 302, operating in a continuous-wave (CW) mode, transmits optical beam 341 to electro-optical modulator 304. A pump laser can also be operated in a pulsed mode. Pump laser 302 is a semiconductor Fabry-Perot (FP) laser. Other pump lasers can be used. The wavelength of the optical beam 341 is tuned by controlling the temperature of pump laser 302. In this example, the wavelength is tuned to $\lambda=774.66$ nm to center the down-converted spectrum on 1549.32 nm. Pump laser 302 operates in a quasi-single-mode regime, in which the dominant mode is about 24.5 dB stronger than its nearest neighbors. Electro-optical modulator 304 is a lithium niobate electro-optical modulator driven by clock pulses (at a frequency of 1 MHz) from clock generator 320. An active feedback bias control (not shown) maintains an extinction ratio of 23 dB.

The output of electro-optical modulator 304 is modulated optical beam 343, which is transmitted to attenuator (ATT) 306. The attenuation value ATT of attenuator 306 can be varied. The output of attenuator 306 is optical beam 345, which is transmitted to PPLN waveguide 308. In response to the pump laser light at a wavelength of $\lambda=774.66$ nm (optical beam 345), PPLN waveguide 308 emits photon pairs at a wavelength of $\lambda=1549.32$ nm. The maximum power conversion efficiency of PPLN waveguide 308 is $1.6\times10^{-6}$ (measured from fiber pigtail to fiber pigtail, including both input and output fiber coupling losses). This efficiency remains above $0.5\times10^{-6}$ for a wide temperature range from approximately 55° C. to approximately 61° C. This efficiency corresponds to about 0.5 photon pairs over the entire spectrum per duration of the detector gate time (discussed below); the value is measured for zero value of attenuation ATT in FIG. 3. The output of PPLN waveguide 308 at output port 330 is optical beam 347, which includes the photon pairs at a wavelength of $\lambda=1549.32$ nm and pump laser light at a wavelength of $\lambda=774.66$ nm.

Optical beam 347 is transmitted to blocker 310, which blocks the pump laser light at a wavelength of $\lambda=774.66$ nm. In one embodiment, blocker 310 is a wavelength division multiplex (WDM) coupler with greater than 90 dB rejection of $\lambda=774.66$ nm light. Other filters can be used to block the pump laser light. The output of blocker 310 at output port 332 is optical beam 349, which transmits the photon pairs at a wavelength of $\lambda=1549.32$ nm. In practice, SPP 202 is housed in a transmitter. The output port 332 of blocker 310 is coupled to the output port 230 of SPP 202 via a short optical fiber. The output of output port 230 is optical beam 251 (see FIG. 2). Pump laser 302, electro-optical modulator 304, clock generator 320, attenuator 306, and PPLN waveguide 308 are controlled by SPP control system 322, which communicates with the overall QKD control system 212 (see FIG. 2).

The spectral transmission window through an optical fiber is partitioned into optical bands defined by wavelength ranges (or their corresponding frequency ranges). Three bands of interest for telecommunications are L-band (1565-1625 nm), C-band (1530-1565 nm), and S-band (1460-1530 nm). Each band, furthermore, can be partitioned into channels; each channel is specified by a center wavelength or frequency and a channel width. The International Telecommunications Union (ITU) has developed a set of industry standards referred to as ITU grids which specify the set of center frequencies. For dense wavelength division multiplexing (DWDM), a grid with a channel spacing of 100 GHz is commonly used.

Figure 4A:
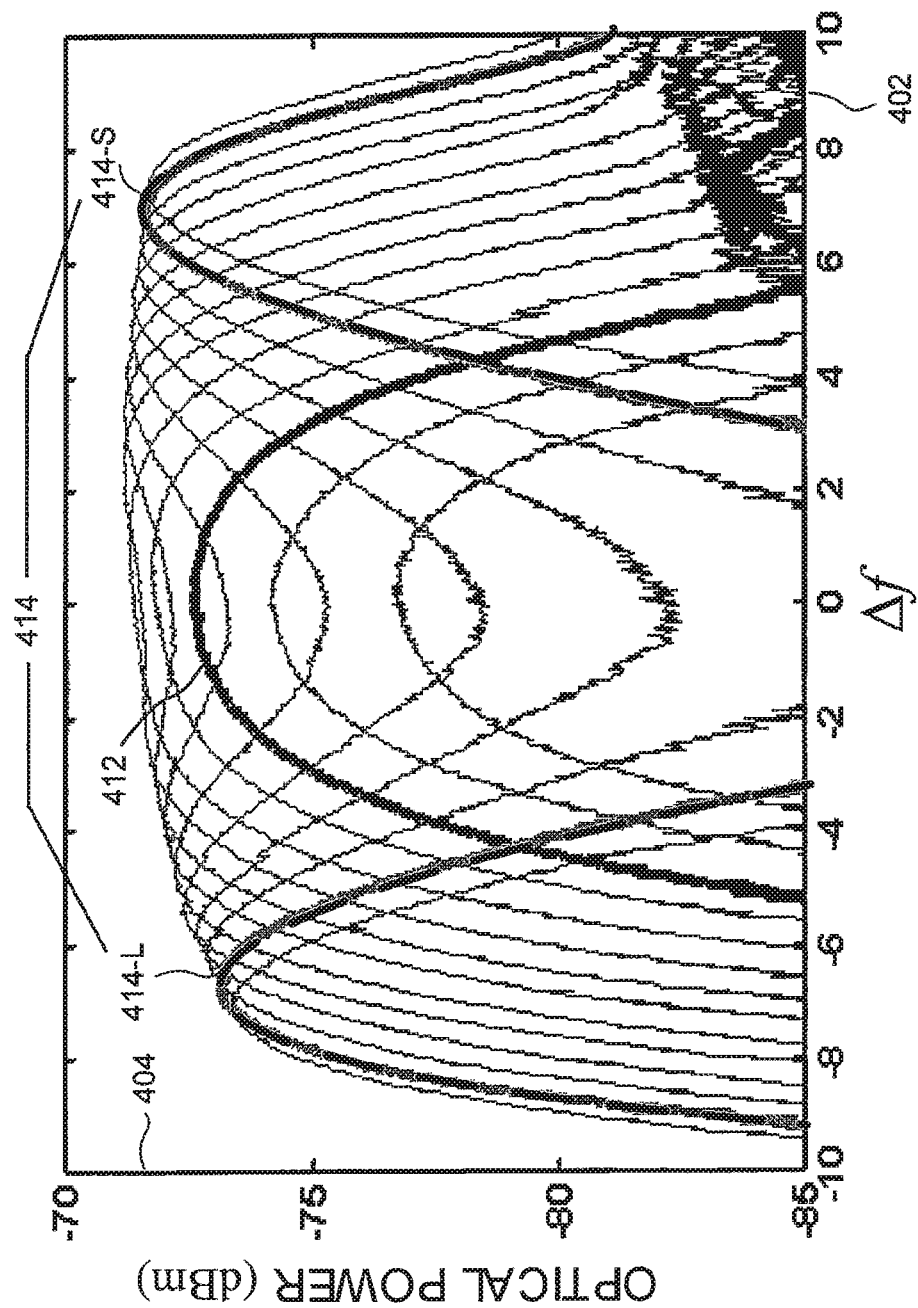

A set of down-converted spectra emitted by SPP 202 is shown in FIG. 4A and FIG. 4B. The horizontal axis 402 represents the frequency expressed as the difference $\Delta f$ from a reference frequency, which, in this instance, is 193.5 THz. The vertical axis 404 represents the optical power in dBm. The output spectra can be tuned by varying the temperature T of PPLN waveguide 308 or by varying the pump wavelength of optical beam 341 emitted by pump laser 302. FIG. 4A shows a family of spectra as the temperature of the PPLN waveguide 308 is varied from T=54.0° C. to T=60.5° C. Two spectra, spectrum 412 and spectrum 414, are highlighted. For clarity, these two spectra are plotted separately in FIG. 4B.

Spectrum 412, obtained with a temperature T=56° C., has a single spectral lobe with maximum power primarily over the C-band. Spectrum 412 can be filtered by a bandpass filter with a bandwidth of 4.5 THz to obtain spectrum 418, which is fully confined within the C-band.

Spectrum 414, obtained with a temperature of T=60° C., has two spectral lobes: spectral lobe 414-S in the S-band and spectral lobe 414-L in the L-band. Wavelength selective switches are designed for adding/dropping channels to/from WDM data streams. To accomplish this, the WSS partitions the input spectrum into WDM channels and directs each individual channel to a specific output port (see, for example, WSS 204 in FIG. 2). Groups of individual channels can be directed to the same output port. In one embodiment, the WSS 204 has 45 WDM channels configured on the 100 GHz-spaced ITU grid ranging from 191.6 THz to 196.0 THz; each channel can be directed to any one of 8 output ports, output port A 234A-output port H 234H. Wavelength selective switches with different numbers of output ports are available.

Figure 5A:
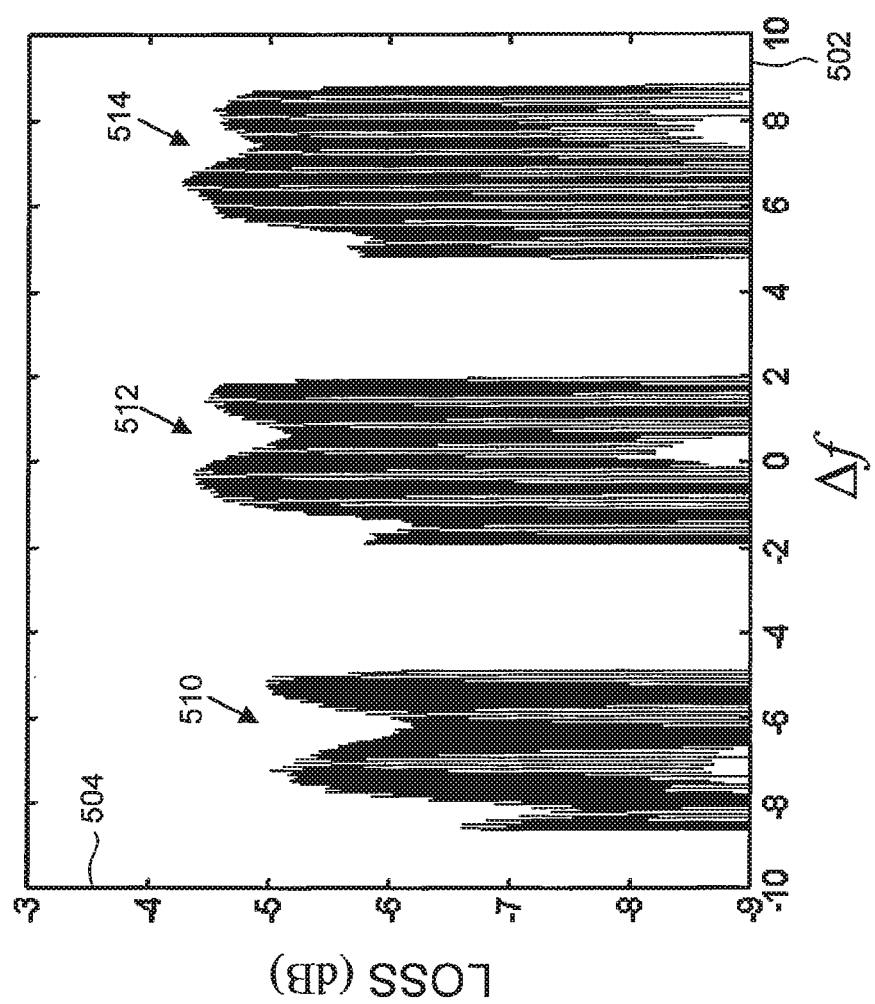
FIG. 5A and FIG. 5B show plots of individual channels at the output of a wavelength.
Figure 5B:
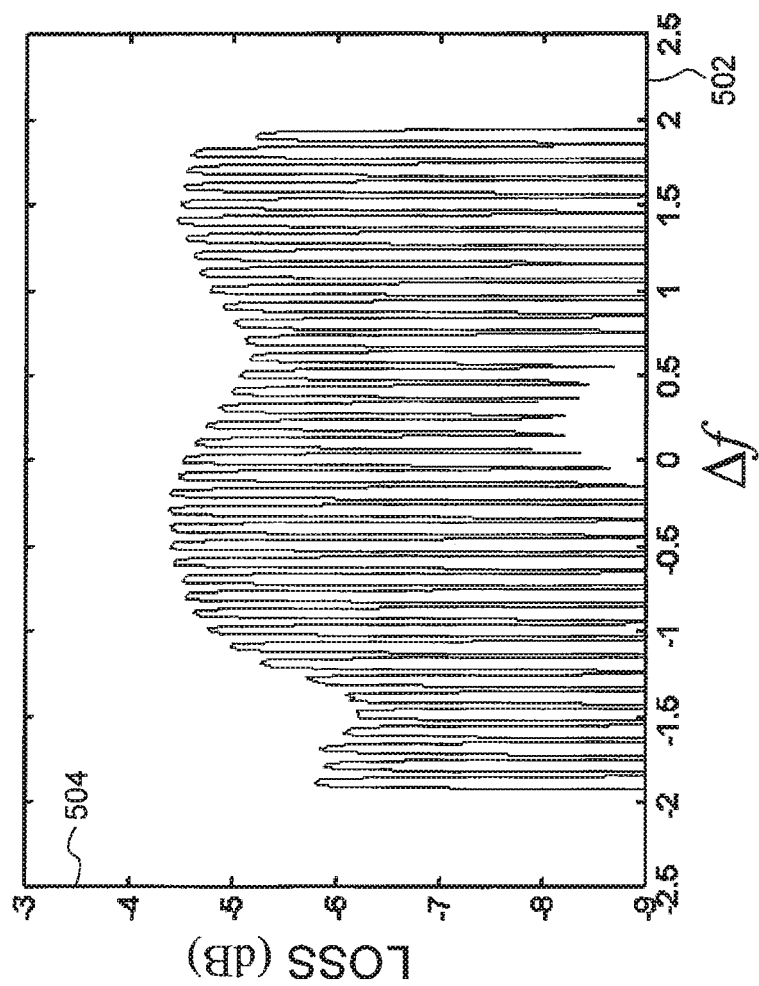

FIG. 5A shows plots of loss (in dBm) as a function of frequency (expressed as $\Delta f$). In an embodiment, the dispersive element used in the WSS is an arrayed waveguide grating (AWG), which yields groups of channels in three output bands, referenced as C-band channel group 512, L-band channel group 510, and S-band channel group 514. The center frequencies of the output bands are separated by 6.79 THz, the free spectral range (FSR) of the grating. FIG. 5B shows a more detailed view of C-band channel group 512. Shown are the transmission spectra of 38 channels (19 pairs). Each channel has a nearly flat top with a 3 dB bandwidth of 77 GHz.

Figure 6A:
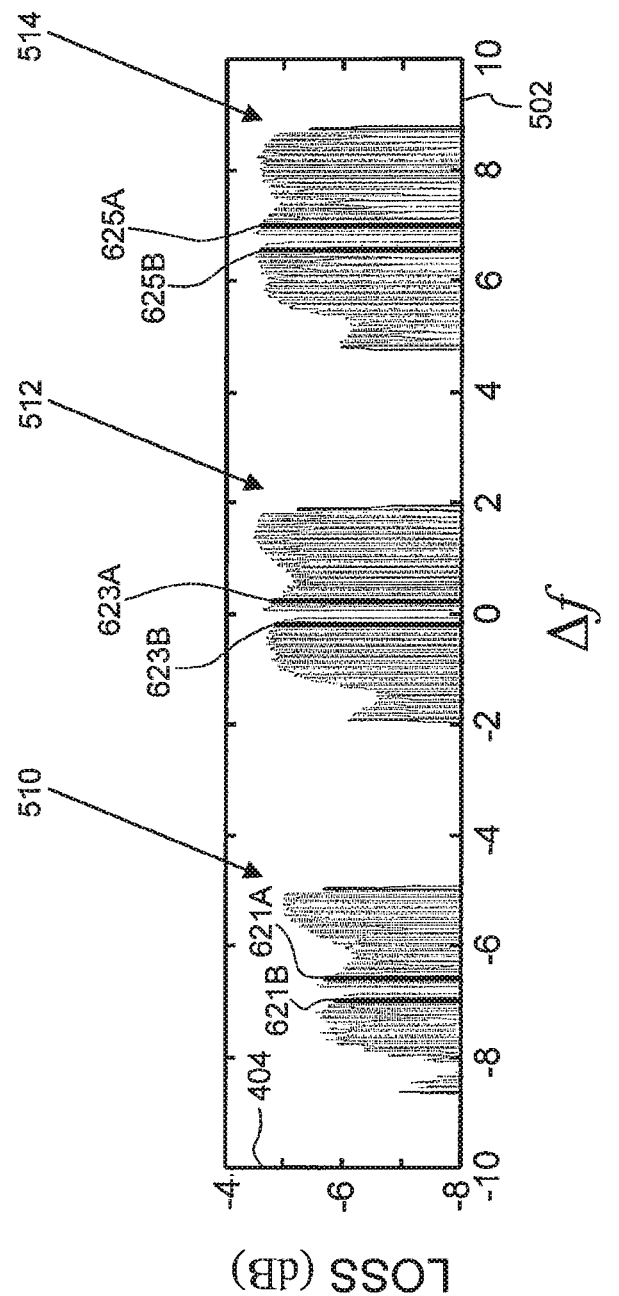
FIG. 6A-FIG. 6C shows plots of channel configurations for a wavelength selective switch.
Figure 6B:
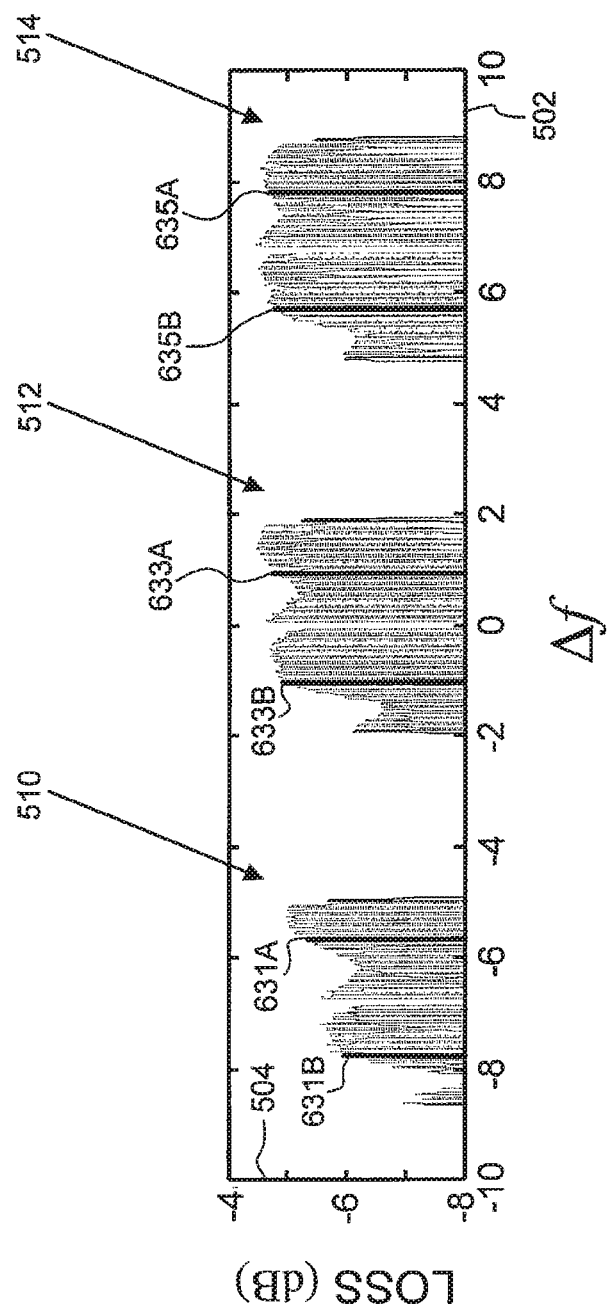
Figure 6C:
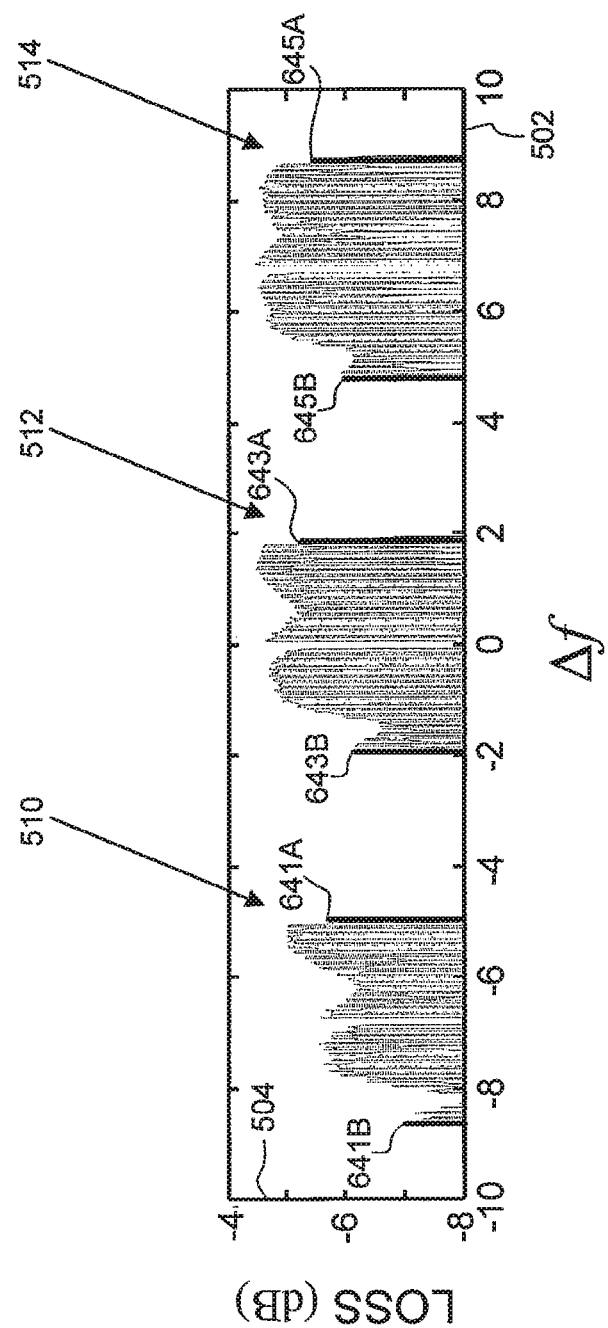

FIG. 6A-FIG. 6C show examples of three different WSS configurations, in which one channel ($N_{ch}^A$) directed to output port A 234A, and the other channel ($N_{ch}^B = -N_{ch}^A$) is directed to output port B 234B. For the C-band, the following convention is used for channel numbering: $N_{ch}(f) = 10 \times (f - 193.5)$, where f is the center frequency of the channel in THz. In FIG. 6A, channel 621A, channel 623A, and channel 625A correspond to $N_{ch}^A=2$, and channel 621B, channel 623B, and channel 625B correspond to $N_{ch}^B=-2$, respectively. In FIG. 6B, channel 631A, channel 633A, and channel 635A correspond to $N_{ch}^A=10$, and channel 631B, channel 633B, and channel 635B correspond to $N_{ch}^B=-10$, respectively. In FIG. 6C, channel 641A, channel 643A, and channel 645A correspond to $N_{ch}^A=19$, and channel 641B, channel 643B, and channel 645B correspond to $N_{ch}^B=-19$, respectively.

Single-photon detectors for wavelengths used in optical telecommunications are typically based on an avalanche photodiode (APD) operated in a counter mode. Operation of an APD is a function of the reverse bias voltage applied across the APD. When the bias voltage exceeds the breakdown voltage, an incident photon can initiate a carrier avalanche, resulting in a charge pulse that can be electronically detected. A carrier avalanche can also be initiated by a source other than an incident photon (such as a trapped charge or a phonon). These other sources can generate background counts, resulting in background noise.

To reduce background noise, an APD can be operated in a gated mode. The bias voltage is modulated by a periodic sequence of pulses (such as rectangular pulses), referred to as bias pulses (also referred to as gate pulses). The amplitude of the bias pulses ranges from a pulse baseline voltage less than the breakdown voltage to a pulse peak voltage greater than the breakdown voltage. The pulse width is referred to as the gate window (also referred to as the gate time). The inverse of the period between pulses is referred to as the trigger rate.

During a bias pulse, the bias voltage is greater than the breakdown voltage, and an incident photon can initiate a carrier avalanche that results in a charge pulse that can be electronically detected. During an afterpulse interval (interval between two pulses), the bias voltage is less than the bias voltage. The charge state of the APD, however, does not relax instantaneously. During an afterpulse interval, an incident photon can still trigger a carrier avalanche, resulting in a detected signal. In addition, as discussed above, even in the absence of incident photons (dark conditions), other sources can trigger carrier avalanches, resulting in dark counts. Dark counts are dependent on the temperature of the APD.

In the absence of dark counts, the probability of coincident detection of two transmitted photons $P_{12}^0$ and the probability of detecting a transmitted photon in the i-th detector $P_i^0$, (i=1, 2), depend on the photon pair statistics. For the embodiment shown in FIG. 2 and FIG. 3, the statistics are Poissonian, and the following expressions for the probabilities of interest can be derived:

$$P_{12}^0 = 1 - \exp(-\mu Q_1 T_1 \eta_1) - \exp(-\mu Q_2 T_2 \eta_2) + \exp[-\mu (Q_1 T_1 \eta_1 + Q_2 T_2 \eta_2 - Q_{12} T_1 T_2 \eta_1 \eta_2)] \quad (E1)$$

$$P_i^0 = 1 - \exp(-\mu Q_i T_i \eta_i). \quad (E2)$$

Here $\mu$ is the total average number of photon pairs over the entire spectrum (emitted by the source of photon pairs) per gate time, $\eta_i$ is the efficiency of the i-th detector, and $T_i$ is the frequency-independent transmittance of the optical path between the pair creation and photon detection points excluding the transmittance through the WSS itself. In this instance, $T_i$ mostly reflects the output fiber-coupling loss of the PPLN waveguide.

The quantities $Q_1$, $Q_2$ and $Q_{12}$ are introduced here to account for creation and routing of a photon in a certain frequency band. The probability density function $\wp(\omega)$ for a photon pair to be generated at the offset frequencies $\pm \omega$ from one half of the pump frequency is the properly normalized down-converted spectrum $S(\omega)$:

$$\wp(\omega) = 2S(\omega) / \int_{-\infty}^{+\infty} S(\omega) d\omega. \quad (E3)$$

The overall action of the WSS can be described by the transfer functions $H_{p1}(\omega)$ and $H_{p2}(\omega)$ relating the spectrum at the WSS input port 232 to the output spectra at WSS output port A 234A (referred to here as port p1) and output port B 234B (referred to here as port p2). These functions reflect a particular configuration of the WSS and change every time the WSS is reconfigured. Since conventional WSSs do not have a broadcasting capability, the two transfer functions do not overlap ($H_{p1}(\omega)H_{p2}(\omega)=0$). The joint probability that each photon of the same pair is transmitted to the corresponding WSS ports is:

$$Q_{12}=\int_{-\infty}^{+\infty} \wp(\omega)|H_{p1}(\omega)|^2|H_{p2}(-\omega)|^2 d\omega. \quad (E4)$$

and the probability of a photon to appear at the i-th output port (where i=1 corresponds to output port A 234A and i=2 corresponds to output port B 234B) is given by:

$$Q_i=\int_{-\infty}^{+\infty} \wp(\omega)|H_{p1}(\omega)|^2 d\omega. \quad (E5)$$

In the presence of dark counts, coincident detections at the single-photon detectors can arise from a photon pair generated in the PPLN and successfully transmitted through the fibers, from dark counts, or from a combination of the two. The total probability of a coincidence can be calculated as the complement to one of the total probability of several events. Using $P_{12}^0$ and $P_i^0$ from (E1) and (E2) and introducing $P_{dci}$ as the probability of a dark count in the i-th SPD, the following expressions are obtained:

$$P_{12} = 1 - (1 - P_{dc1})(1 - P_{dc2})(1 - P_{12}^0) - \quad (E6)$$
$$P_{dc1}(1 - P_{dc2})(1 - P_1^0) - P_{dc2}(1 - P_{dc1})(1 - P_2^0)$$

$$P_i = 1 - (1 - P_{dci})\exp(-\mu Q_i T_i \eta_i). \quad (E7)$$

The above analysis above applies for other optical systems in which the loss of a quantum channel is frequency dependent. A closed form expression for $P_{12}^0$ exists even when the statistics of the pairs is many-fold thermal. It converges to the expression of (E1) as the number of modes goes to infinity.

The above analysis is first verified by measuring coincident counts between individual WDM channels in the C-band. The temperature of the PPLN waveguide 308 (see FIG. 3) is set to T=56° C., and the output is filtered to ensure that the downconverted spectrum has no overlap with the S-band and L-band (spectrum 418 in FIG. 4B). A pair of symmetric channels, $N_{ch}^A$ and $N_{ch}^B=N_{ch}^A$, is directed to port A 234A and port B 234B (see FIG. 2), respectively. The coincidence counts are measured for 30 seconds.

Figure 7B:
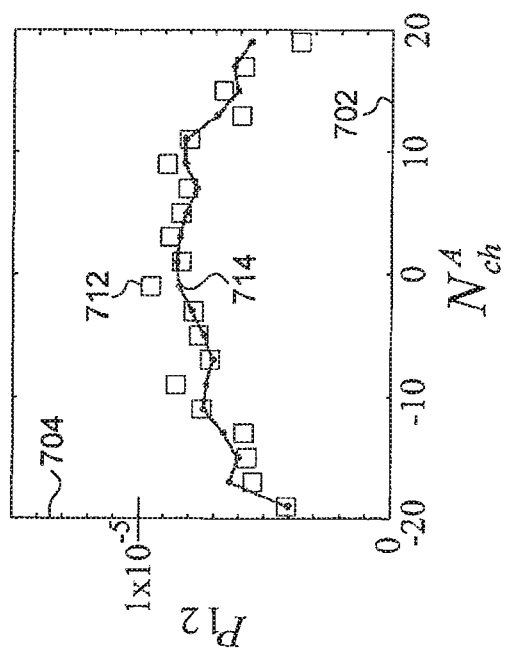
FIG. 7A and FIG. 7B show plots of coincidence probability as a function of channel number.
Figure 7A:
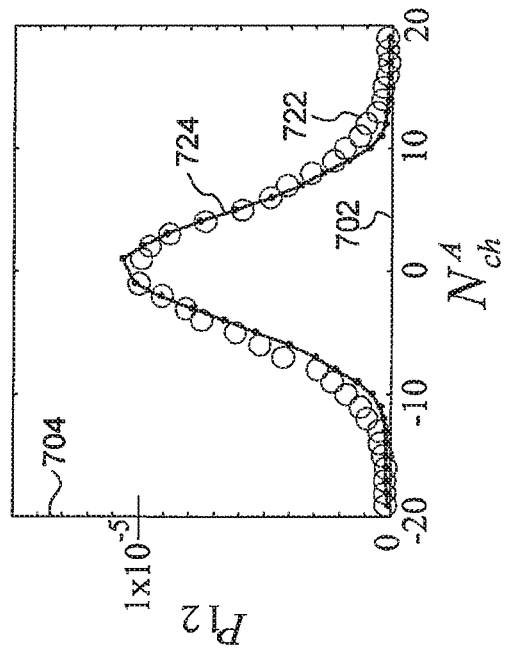

In the plot shown in FIG. 7A, the horizontal axis 702 represents the channel number $N_{ch}^A$; the vertical axis 704 represents the coincidence counts $P_{12}$. In FIG. 7A, the individual data points 712 are plotted. The dependence is not flat, mostly due to the wavelength dependent loss of the WSS 204 (see FIG. 2). The independent measurements of the loss spectrum permit evaluation of the integrals $Q_1$, $Q_2$, and $Q_{12}$. Using them together with the independently obtained maximum average number of pairs per unit time $\mu_{max}$ (see discussion below for more details of this parameter), the coincidence probability $P_{12}$ can be calculated from (E6). The calculated values are shown as curve 714 in FIG. 7A. Note that the calculated curve fits the data well and captures nearly all features of a non-trivial frequency profile exhibited by the data.

The above analysis can be further verified with channels in the S-band and L-band. The test utilizes the free spectral range (FSR) periodicity of a WSS. For the same configuration of the WSS described above ($N_{ch}^A$ and $N_{ch}^B=-N_{ch}^A$), the actual frequency bands that are directed to each port include two well-separated WDM peaks, one in the S-band and one in the L-band. The aggregate outputs are not completely symmetric in frequency; also, they vary in loss. The center frequencies of the three bands (S, C, and L) are separated by exactly the same amount FSR=6.79 THz, but the channel separation within each band is different for each band. In WSS 204, the channel separations within the S-band, C-band, and L-band are 103.6 GHz, 99.9 GHz, and 96.5 GHz, respectively. This behavior arises from the material properties and is common for all AWGs, on which WSSs are based. The specific values of the channel separations are dependent of the particular WSS component used.

For large channel numbers ($|N_{ch}^{A,B}|\geq 10$), the symmetry is lost and, therefore, the coincidence counts drop, as shown in FIG. 7B. Plotted in FIG. 7B are the data points 722. Curve 724, calculated from (E6), is in good agreement with the data. Because the coincidence rate remains relatively high for at least a few central channels, the FSR periodicity property of AWGs, together with the temperature tuning of the PPLN waveguide, can be used to quickly move the quantum channel to and from the C-band without interrupting QKD service for a long period of time.

The above spectral properties can be used for bandwidth provisioning of a QKD system. In optical fiber systems, typically only the C-band is used. The loss in the C-band is lower than in the S-band or L-band, and more channels are available in the C-band than in the S-band or L-band. The term "classical channel" refers to a channel carrying conventional data, in distinction to a "quantum channel" carrying quantum information. Since quantum channels utilize low photon fluxes, conventional data (classical data) transported over classical channels can strongly interfere with quantum information (quantum data) transported over quantum channels in the same band. If classical data traffic is not too heavy, there can be suitable pairs of channels in the C-band available for quantum data traffic. If classical data traffic is heavy and there are no suitable pairs of channels available in the C-band for quantum data traffic, then quantum data traffic can be dynamically allocated to a pair of channels utilizing a combination of the S-band and L-band.

Figure 1B:
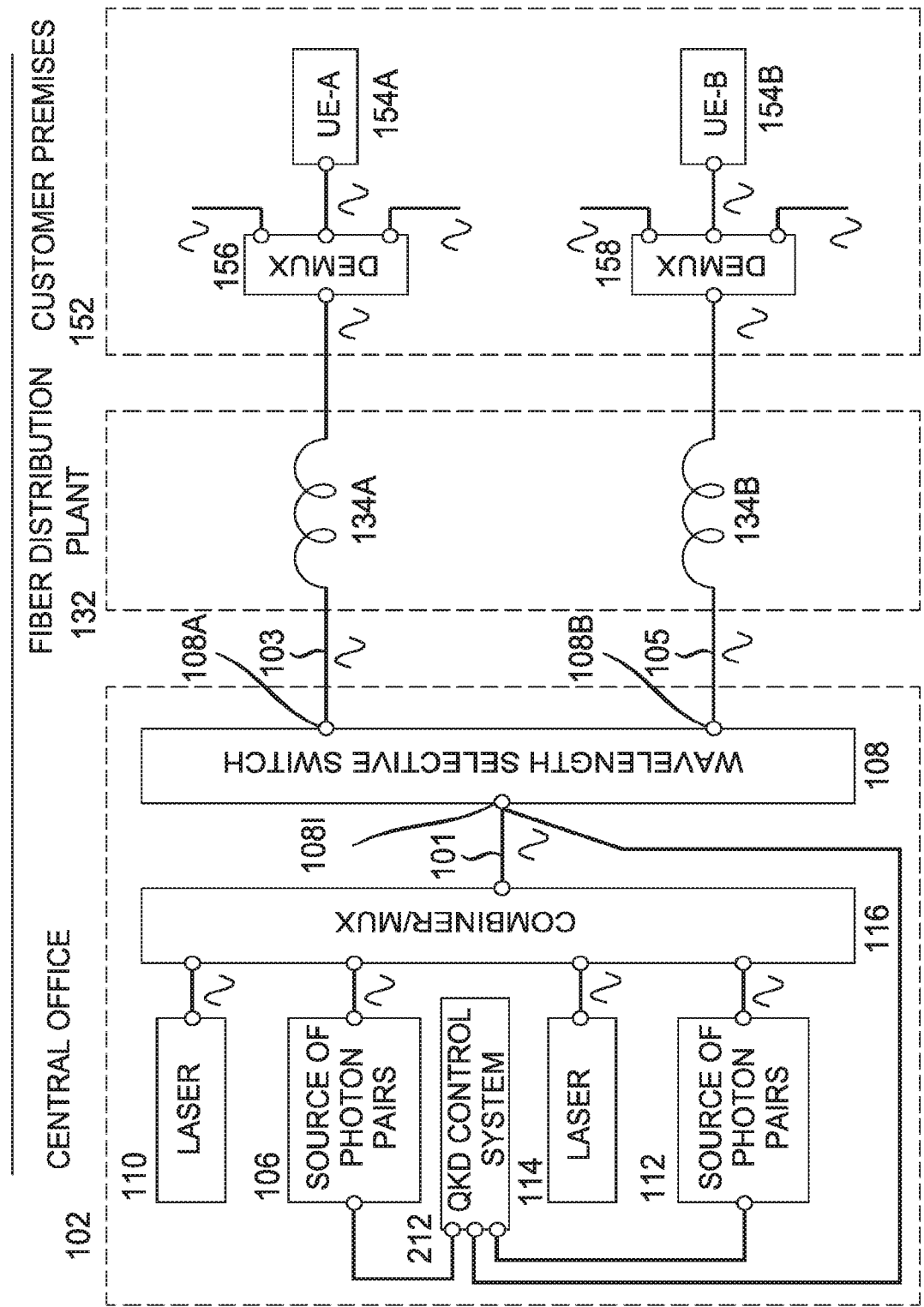
FIG. 1B shows a high-level schematic of an optical network configured to transport a combination of classical data and quantum data.

In the optical network previously shown in FIG. 1A, a single optical source (source of photon pairs 106) is coupled to the input port of WSS 108. Other optical sources, including sources of photon pairs for quantum channels and conventional optical sources (such as lasers) for classical channels, can be coupled together and directed to the input port of WSS 108. In the optical network shown in FIG. 1B, there are four input optical sources: laser 110, laser 114, source of photon pairs 112, and the previous source of photon pairs 106. The output from the four input optical sources are fed into input ports of combiner/multiplexer 116. The output optical beam 101 from combiner/multiplexer 116 is transmitted into the input port 108I of WSS 108. QKD control system 212 is depicted connected to input port 108I of WWS 108, source of photon pairs 106, and source of photon pairs 112.

Optical beam 103 is transmitted from output port 108A of WSS 108, across optical fiber 134A, and into the input port of demultiplexer 156. One of the output ports of demultiplexer 156 is coupled to the input port of UE-A 154A. Similarly, optical beam 105 is transmitted from output port 108B of WSS 108, across optical fiber 134B, and into the input port of demultiplexer 158. One of the output ports of demultiplexer 158 is coupled to the input port of UE-B 154B. Light from the input optical sources can be switched to UE-A 154A or UE-B 154B by controlling the wavelengths of the input optical sources and the configuration of WSS 108.

Figure 8:
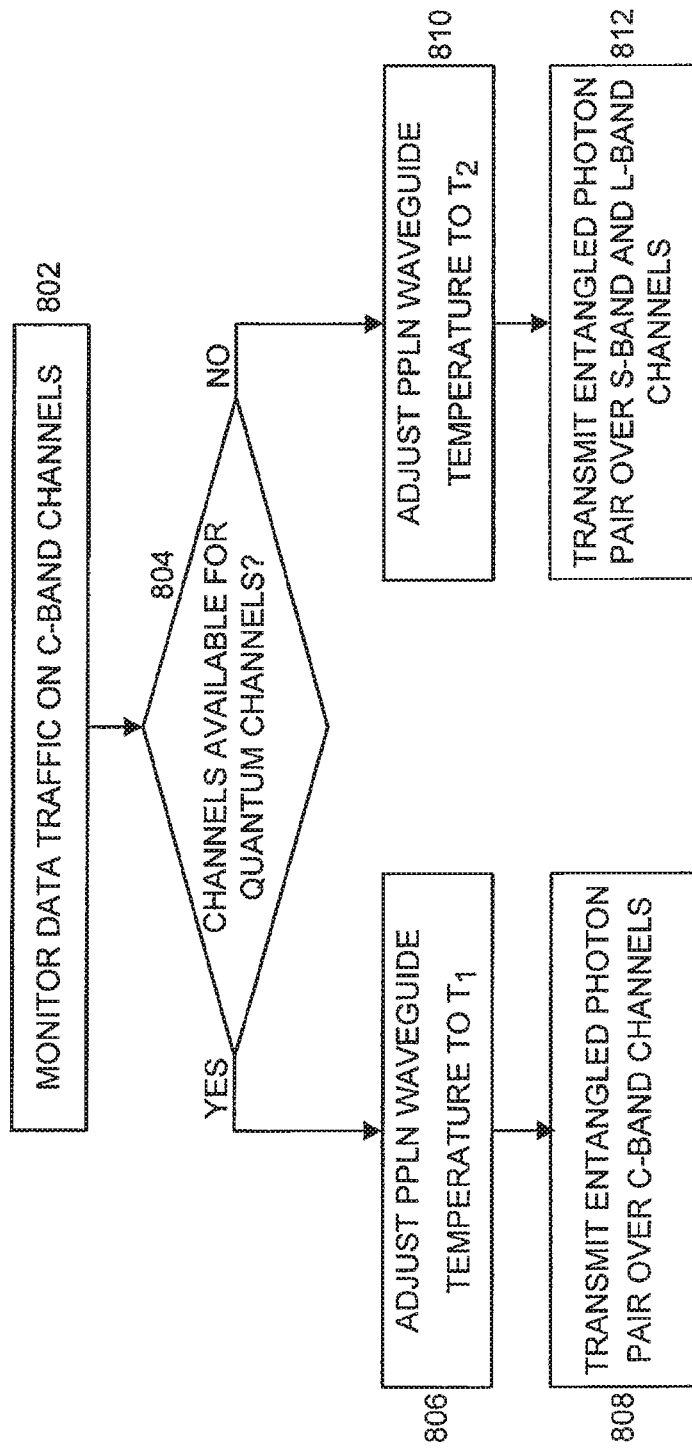
FIG. 8 shows a flowchart of a method for provisioning quantum channels.

A flowchart of a method for bandwidth provisioning is shown in FIG. 8. In step 802, classical data traffic on C-band channels is monitored at one or more reference points in the optical network. Suitable reference points include input port 108I, output port 108A, and output port 108B of WSS 108. Other suitable reference points are points along optical fibers coupled to these ports. The process then passes to decision step 804. If a suitable pair of quantum channels is available in the C-band (determined by the relationship: the frequency of the first channel+the frequency of the second channel=2× the pump laser frequency), then the process passes to step 806, and the temperature of PPLN waveguide 308 is adjusted to a first temperature $T_1$ (in one embodiment, $T_1$ is approximately 56° C.) to produce a single-lobe spectrum in the C-band. The process then passes to step 808, in which a pair of entangled photons is transmitted across a pair of quantum channels in the C-band.

Refer back to decision step 804. If a suitable pair of quantum channels in the C-band is not available, then the process passes to step 810, and the temperature of PPLN waveguide 308 is adjusted to a second temperature $T_2$ (in one embodiment, $T_2$ is approximately 60° C.) to produce a dual-lobe spectrum, with one lobe in the S-band and one lobe in the L-band. The process then passes to step 812, in which a pair of entangled photons is transmitted across a pair of quantum channels in the combined S-band and L-band.

In the embodiment described above, the spectral properties of the light emitted by PPLN waveguide 308 are tuned by varying the temperature of the PPLN waveguide 308. In another embodiment, the spectral properties of the light emitted by PPLN waveguide 308 are tuned by varying the frequency of the pump laser light emitted by pump laser 302 (see FIG. 3). One skilled in the art can develop other embodiments in which a source of entangled photon pairs can be tuned to emit pairs of entangled photons in either a first frequency band or in a combination of a second frequency band and a third frequency band.

Monitoring the key performance parameters of a QKD system is important for reliable operation. Measurements that can be performed without disconnecting network elements are advantageous to minimize system downtime. Refer to FIG. 2 and FIG. 3. For a QKD system with a source of entangled photon pairs, three primary operational system parameters of a QKD system are the efficiency $\eta_1$ of SPD-1 206, efficiency $\eta_2$ of SPD-2 208, and the maximum average number of photon pairs per unit time $\mu_{max}$ at the output port 330 of the PPLN waveguide 308. Note that the average number of photon pairs $\mu$ emitted by PPLN waveguide 308 is a function of the input pump power. Here $\mu_{max}$ refers to the maximum average number of photon pairs per unit time generated by PPLN waveguide 308 at maximum input pump power.

Refer to FIG. 2 and FIG. 3. As discussed above, PPLN waveguide 308 typically is packaged in a transmitter; therefore, output port 330 is not directly accessible by the telecommunications services provider. The closest access port will vary with the system configuration. In FIG. 3, the closest access port is output port 230 of SPP 202. In other instances, output port 230 is connected via a fiberoptic cable to an optical connector (or splitter) on a connector panel (not shown), and service access is provided at the connector panel. In general, there will be loss between output port 330 and the service access port (which, for this discussion, is assumed to be output port 230). This port-to-port loss $loss_{pt-pt}$ can be about a few dB.

This loss can result in broken pairs of photons. If pairs of photons are emitted at output port 330, then, at output port 230, there can be a combination of pairs of photons as well as single unpaired photons. The single unpaired photons cannot be used for quantum key distribution. If the maximum average number of photon pairs per unit time emitted at the output port 330 is $\mu_{max}$, then the average number of photons per unit time measured at output port 230 is $2\mu_{max}T_{pt-pt}$, where $T_{pt-pt}$ is the transmittance corresponding to $loss_{pt-pt}$. At output port 230, the average number of photon pairs per unit time is $\mu_{max}T_{pt-pt}^2$ and the average number of single unpaired photons per unit time is $2\mu_{max}T_{pt-pt}(1-T_{pt-pt})$. Since $T_{pt-pt}$, in general, is not known to the service provider, the average number of photon pairs per unit time $\mu_{max}T_{pt-pt}^2$ at output port 230 cannot be directly derived from measurements of $2\mu_{max}T_{pt-pt}$. To maintain high security, the service provider needs to adjust the average number of photon pairs per unit time as a function of various network parameters, such as the distances between the source and the detectors and the bandwidth of the links between the source and the detectors.

Figure 9:
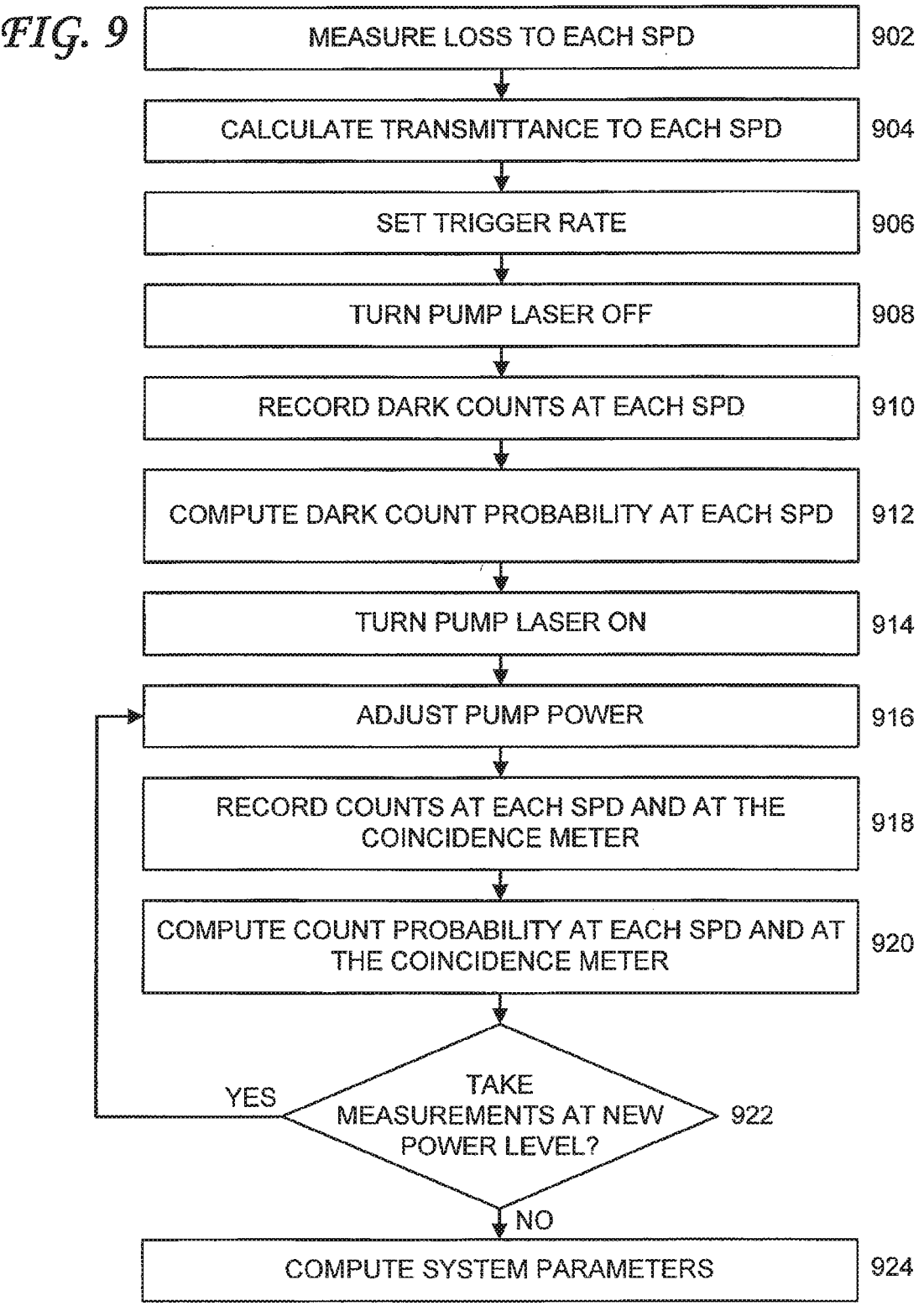
FIG. 9 shows a flowchart of a method for characterizing system parameters of a quantum key distribution optical network.

FIG. 9 shows a flowchart of steps for a method for measuring the operational systems parameters of a QKD system. In step 902, the loss $loss_1$ between port 330 of SSP 202 and port 238 of SPD-1 206 and the loss $loss_2$ between port 330 of SSP 202 and port 240 of SPD-2 208 are measured. The process then passes to step 904, in which the transmittance $$T_1 = 10^{\frac{loss_1(dB)}{10}}$$

and the transmittance $$T_2 = 10^{\frac{loss_2(dB)}{10}}$$

are calculated. The process then passes to step 906, in which the trigger rate R of SPD-1 206 and SPD-2 208 is set. The process then passes to step 908, in which the pump laser 302 is turned off. The process then passes to step 910, in which the dark count $D_{dark1}$ at SPD-1 206 and the dark count $D_{dark2}$ at SPD-2 208 are recorded over a predetermined time interval (for example, 1 sec). The process then passes to step 912, in which the dark count probability $P_{dc1}=D_{dark1}/R$ and the dark count probability $P_{dc2}=D_{dark2}/R$ are computed.

The process then passes to step 914, in which the pump laser 302 is turned on. The process then passes to step 916, in which the pump power into the PPLN waveguide 308 is adjusted by varying the attenuation ATT (here ATT<0) of the attenuator 306. The process then passes to step 918, in which the detector count $D_{count1}$ at SPD 1 206, the detector count $D_{count2}$ at SPD 2 208, and the coincidence count $D_{coin}$ are recorded over a predetermined time interval. The process then passes to step 920, in which the count probability $P_1=D_{count1}/R$, the count probability $P_2=D_{count2}/R$, and the coincidence count probability $P_{12}=D_{coin}/R$ are computed. The process then passes to decision step 922. Step 916-step 920 are to be iterated for a total of N (a predetermined integer) different values of the output power of PPLN waveguide 308 by adjusting the attenuation ATT to vary the input pump power. If measurements are to be taken at a new output power level of PPLN waveguide 308, then the process returns to step 916, in which the output power is adjusted to a new level; step 918 and step 920 are then repeated.

When N iterations have been completed, the process then passes from step 922 to step 924, in which the operational systems parameters are computed. The data collected from the multiple iterations of step 916-step 920 yields the three experimentally determined functions $P_1(ATT)$, $P_2(ATT)$, and $P_{12}(ATT)$. A joint fit of the three experimentally determined functions are performed with the following three analytical functions, in which $\mu_{max}$ (maximum average number of photon pairs per unit time), $\eta_1$ (efficiency of SPD-1 206) and $\eta_2$ (efficiency of SPD-2 208) are the fitting parameters:

$$P_1 = 1 - (1 - P_{dc1}) \times \exp\left(-10^{\frac{ATT}{10}} \times \mu_{max} \times T_1 \times \eta_1\right) \quad (E8)$$

$$P_2 = 1 - (1 - P_{dc2}) \times \exp\left(-10^{\frac{ATT}{10}} \times \mu_{max} \times T_2 \times \eta_2\right) \quad (E9)$$

$$P_{12} = 1 - (1 - P_{dc1}) \times (1 - P_{dc2}) \times (1 - P_{12}^0) - \quad (E10)$$
$$P_{dc1} \times (1 - P_{dc2}) \times (1 - P_2) - P_{dc2} \times (1 - P_{dc1}) \times (1 - P_1).$$

where, $$P_{12}^0 = 1 - \exp\left(-10^{\frac{ATT}{10}} \times \mu_{max} \times T_1 \times \eta_1\right) - \quad (E11)$$
$$\exp\left(-10^{\frac{ATT}{10}} \times \mu_{max} \times T_2 \times \eta_2\right) +$$
$$\exp\left(-10^{\frac{ATT}{10}} \times \mu_{max} \times (T_1 \times \eta_1 + T_2 \times \eta_2 - T_1 \times \eta_1 \times T_2 \times \eta_2)\right)$$

Using standard curve-fitting techniques, the best joint fits yield the operational systems parameters $\mu_{max}$, $\eta_1$ and $\eta_2$. Relationships (E8)-(E11) hold for a frequency-selective splitter such as a wavelength division demultiplexer, wavelength selective switch, and a reconfigurable optical add/drop multiplexer. For other splitters, such as a 1:N splitter (where N is the number of output ports) with no wavelength demultiplexing, other relationships can be derived.

Figure 10:
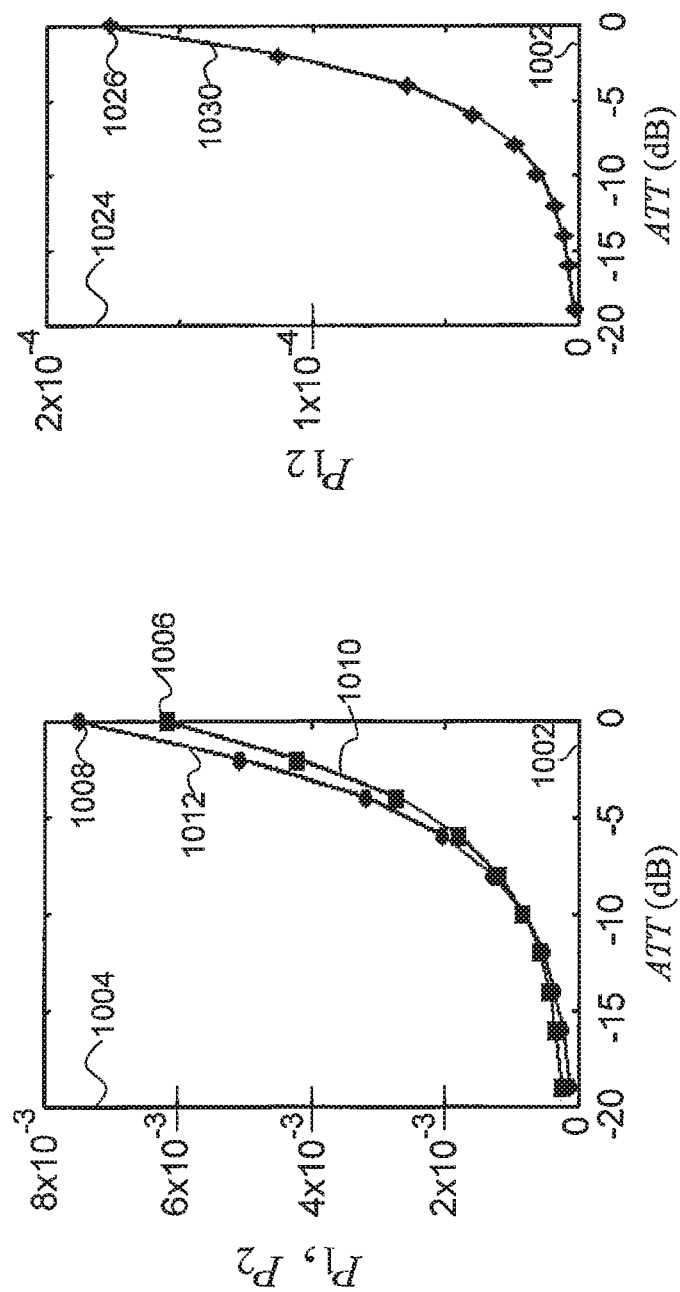
FIG. 10A and FIG. 10B show plots of count probabilities as a function of attenuation of pump power.

Examples of results are shown in FIG. 10A and FIG. 10B. Values of attenuation ATT are plotted along the horizontal axis 1002. The values of $P_1(ATT)$ and $P_2(ATT)$ are plotted along the vertical axis 1004 in FIG. 10A; the values of $P_{12}(ATT)$ are plotted along the vertical axis 1024 in FIG. 10B. In FIG. 10A, data points 1006 represent the measured values of $P_1(ATT)$, and data points 1008 represent the measured values of $P_2(ATT)$. Plot 1010 represents the best-fit curve from (E8), and plot 1012 represents the best-fit curve from (E9). In FIG. 10B, data points 1026 represent the measured values of $P_2(ATT)$, and plot 1030 represents the best-fit curve from (E10). In this example, the derived values of the operational systems parameters are $\eta_1=10\%$, $\eta_2=13\%$, and $\mu_{max}=0.57$.

Figure 11:
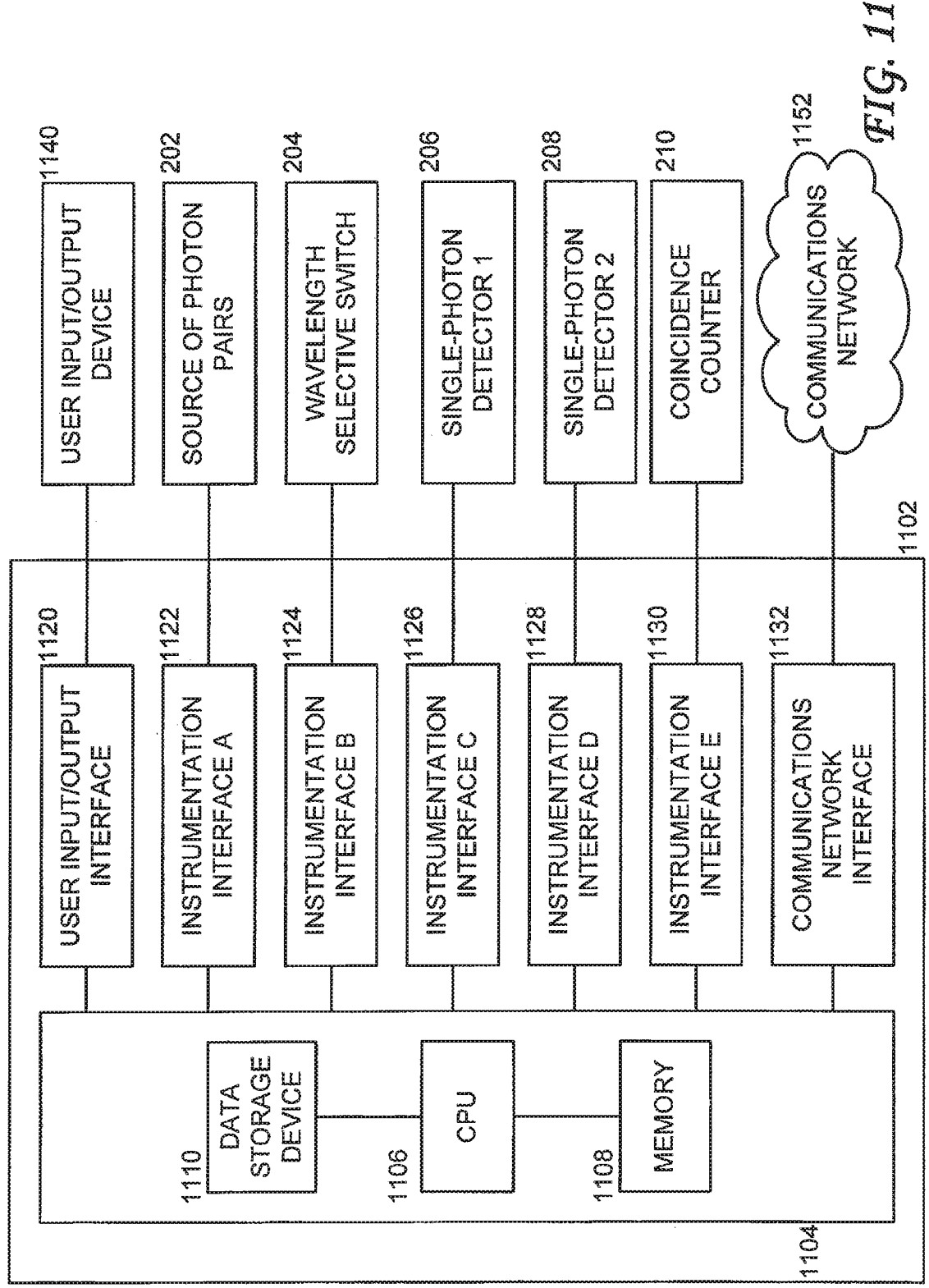
FIG. 11 shows a high-level schematic of a computational system implementing a quantum key distribution control system.

FIG. 11 shows a schematic of an embodiment of a computational system for implementing a QKD control system 212 (see FIG. 2). One skilled in the art can construct the computational system 1102 from various combinations of hardware, firmware, and software. One skilled in the art can construct the computational system 1102 from various combinations of electronic components, such as general purpose microprocessors, digital signal processors (DSPs), application-specific integrated circuits (ASICs), and field-programmable gate arrays (FPGAs).

Computational system 1102 comprises computer 1104, which includes a central processing unit (CPU) 1106, memory 1108, and data storage device 1110. Data storage device 1110 comprises at least one non-transitory, persistent, tangible computer readable medium, such as non-volatile semiconductor memory, a magnetic hard drive, and a compact disc read only memory.

Computational system 1102 can further comprise one or more user input/output interfaces that interface computer 1104 with user input/output devices. For example, user input/output interface 1120 interfaces computer 1104 with user input/output device 1140. Examples of user input/output device 1140 include a keyboard, a mouse, and a local access terminal. Data, including computer executable code, can be transferred to and from computer 1104 via user input/output interface 1120. Computational system 1102 can further comprise a video display interface (not shown), which drives a video display (not shown) and can receive user input from the video display.

Computational system 1102 can further comprise one or more instrumentation interfaces. For example, instrumentation interface A 1122 interfaces computer 1104 with source of photon pairs 202 (see FIG. 2); instrumentation interface B 1124 interfaces computer 1104 with wavelength selective switch 204; instrumentation interface C 1126 interfaces computer 1104 with single-photon detector 1 206; instrumentation interface D 1128 interfaces computer 1104 with single-photon detector 2 208; and instrumentation interface E 1130 interfaces computer 1104 with coincidence counter 210.

Computational system 1102 can further comprise one or more communications network interfaces that interface computer 1104 with communications networks, such as local area networks and wide area networks. Data, including computer executable code, can be transferred to and from computer 1104 via communications network interfaces. For example, communications network interface 1132 interfaces computer 1104 with communications network 1152. Computational system 1102 can be remotely accessed and controlled via communications network 1152. A QKD server (for example, QKD server 104 in FIG. 1) can communicate with computational system 1102 via communications network 1152 or via a local interface (not shown). In some embodiments, source of photon pairs 202, wavelength selective switch 204, single-photon detector 1 206, single-photon detector 2 208, and coincidence counter 210, either individually or in combination, can communicate with computer 1104 via communications network 1152.

As is well known, a computer operates under control of computer software, which defines the overall operation of the computer and applications. CPU 1106 controls the overall operation of the computer and applications by executing computer program instructions that define the overall operation and applications. The computer program instructions can be stored in data storage device 1110 and loaded into memory 1108 when execution of the program instructions is desired. The method steps shown in the flowcharts in FIG. 8 and FIG. 9 can be defined by computer program instructions stored in memory 1108 or in data storage device 1110 (or in a combination of memory 1108 and data storage device 1110) and controlled by the CPU 1106 executing the computer program instructions. For example, the computer program instructions can be implemented as computer executable code programmed by one skilled in the art to perform algorithms implementing the method steps shown in the flowcharts in FIG. 8 and FIG. 9. Accordingly, by executing the computer program instructions, the CPU 1106 executes algorithms implementing the method steps shown in the flowcharts in FIG. 8 and FIG. 9.

The foregoing Detailed Description is to be understood as being in every respect illustrative and exemplary, but not restrictive, and the scope of the inventive concept disclosed herein is not to be determined from the Detailed Description, but rather from the claims as interpreted according to the full breadth permitted by the patent laws. It is to be understood that the embodiments shown and described herein are only illustrative of the principles of the present disclosure and that various modifications may be implemented by those skilled in the art without departing from the scope and spirit of the disclosure. Those skilled in the art could implement various other feature combinations without departing from the scope and spirit of the disclosure.

The invention claimed is:

1. A method comprising:
   determining whether a pair of channels in an optical fiber network are available for transmission of a pair of quantum entangled photons via a first frequency band associated with one of a plurality of optical sources, wherein the pair of channels is not available in the first frequency band when a quantity of non-quantum data traffic in the first frequency band is heavy; and
   transmitting the pair of quantum entangled photons via a second frequency band in the optical fiber network in response to determining that the pair of channels is not available in the first frequency band.

2. The method of claim 1, further comprising:
   determining, at a subsequent time period, that the pair of channels is available in the first frequency band; and
   transmitting a second pair of quantum entangled photons via the first frequency band in response to the determining that the pair of channels is available in the first frequency band at the subsequent time period.

3. The method of claim 2, wherein the one of the plurality of optical sources comprises a periodically-poled lithium niobate waveguide.

4. The method of claim 3, wherein the transmitting the second pair of quantum entangled photons via the first frequency band comprises:
   adjusting a temperature of the periodically-poled lithium niobate waveguide.

5. The method of claim 4, wherein the temperature is 56 degrees Celsius.

6. The method of claim 4, wherein the temperature is 60 degrees Celsius.

7. The method of claim 1, wherein the first frequency band is a telecommunications C-band and the second frequency band is a telecommunications S-band.

8. An apparatus comprising:
   a memory storing computer program instructions; and
   a processor communicatively coupled to the memory, the processor configured to execute the computer program instructions, which, when executed, cause the processor to perform operations, the operations comprising:
      determining whether a pair of channels in an optical fiber network are available for transmission of a pair of quantum entangled photons via a first frequency band associated with one of a plurality of optical sources, wherein the pair of channels is not available in the first frequency band when a quantity of non-quantum data traffic in the first frequency band is heavy; and
      transmitting the pair of quantum entangled photons via a second frequency band in the optical fiber network in response to determining that the pair of channels is not available in the first frequency band.

9. The apparatus of claim 8, the operations further comprising:
   determining, at a subsequent time period, that the pair of channels is available in the first frequency band; and
   transmitting a second pair of quantum entangled photons via the first frequency band in response to the determining that the pair of channels is available in the first frequency band at the subsequent time period.

10. The apparatus of claim 9, wherein the one of the plurality of optical sources comprises a periodically-poled lithium niobate waveguide.

11. The apparatus of claim 10, wherein the transmitting the second pair of quantum entangled photons via the first frequency band comprises:
    adjusting a temperature of the periodically-poled lithium niobate waveguide.

12. The apparatus of claim 11, wherein the temperature is 56 degrees Celsius.

13. The apparatus of claim 11, wherein the temperature is 60 degrees Celsius.

14. The apparatus of claim 8, wherein:
    the first frequency band is a telecommunications C-band; and
    the second frequency band is a telecommunications S-band.

15. A computer readable medium storing computer program instructions which, when executed on a processor, cause the processor to perform operations, the operations comprising:
    determining whether a pair of channels in an optical fiber network are available for transmission of a pair of quantum entangled photons via a first frequency band associated with one of a plurality of optical sources, wherein the pair of channels is not available in the first frequency band when a quantity of non-quantum data traffic in the first frequency band is heavy; and
    transmitting the pair of quantum entangled photons via a second frequency band in the optical fiber network in response to determining that the pair of channels is not available in the first frequency band.

16. The computer readable medium of claim 15, the operations further comprising:
    determining, at a subsequent time period, that the pair of channels is available in the first frequency band; and
    transmitting a second pair of quantum entangled photons via the first frequency band in response to the determining that the pair of channels is available in the first frequency band at the subsequent time period.

17. The computer readable medium of claim 16, wherein the one of the plurality of optical sources comprises a periodically-poled lithium niobate waveguide.

18. The computer readable medium of claim 17, wherein the transmitting the second pair of quantum entangled photons via the first frequency band comprises:
    adjusting a temperature of the periodically-poled lithium niobate waveguide.

19. The computer readable medium of claim 18, wherein the temperature is 56 degrees Celsius.

20. The computer readable medium of claim 18, wherein the temperature is 60 degrees Celsius.

* * * * *